United States Patent
Otorii et al.

(10) Patent No.: US 8,941,347 B2
(45) Date of Patent: Jan. 27, 2015

(54) CONVERTER CONTROL DEVICE AND AIR CONDITIONER INCLUDING CONVERTER CONTROL DEVICE

(71) Applicants: Yu Otorii, Tokyo (JP); Katsuhiko Saito, Tokyo (JP); Masahiro Fukuda, Tokyo (JP)

(72) Inventors: Yu Otorii, Tokyo (JP); Katsuhiko Saito, Tokyo (JP); Masahiro Fukuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 31 days.

(21) Appl. No.: 13/845,286

(22) Filed: Mar. 18, 2013

(65) Prior Publication Data
US 2014/0225553 A1   Aug. 14, 2014

(30) Foreign Application Priority Data

Apr. 12, 2012 (JP) .................................. 2012-090701

(51) Int. Cl.
*H02P 27/08* (2006.01)
*F24F 5/00* (2006.01)
*H02M 7/06* (2006.01)

(52) U.S. Cl.
USPC ... 318/722; 318/139; 318/400.13; 318/400.3; 363/34; 363/40; 363/89

(58) Field of Classification Search
USPC ............ 318/139, 722, 400.13, 400.3; 363/34, 363/40, 89
See application file for complete search history.

(56) References Cited

U.S. PATENT DOCUMENTS

| | | | |
|---|---|---|---|
| 5,005,115 A * | 4/1991 | Schauder | 363/159 |
| 5,914,587 A * | 6/1999 | Liu | 323/222 |
| 6,181,539 B1 | 1/2001 | Maejima et al. | |
| 6,310,787 B2 * | 10/2001 | Ito et al. | 363/34 |

(Continued)

FOREIGN PATENT DOCUMENTS

| | | |
|---|---|---|
| JP | 07-231661 A | 8/1995 |
| JP | 2004-282958 A | 10/2004 |

(Continued)

OTHER PUBLICATIONS

Office Action dated Jul. 29, 2014 issued in corresponding AU patent application No. 2013203402.

*Primary Examiner* — Paul Ip
(74) *Attorney, Agent, or Firm* — Posz Law Group, PLC (57) ABSTRACT

A converter control device comprises: a voltage-zero-cross detection unit detecting zero cross of the alternate-current voltage and outputting a voltage zero-cross signal; a power-source-current detection unit detecting a power source current of the alternate-current power source; a bus-line-voltage detection unit detecting a bus-line voltage between terminals of the smoothing capacitor; a PWM-signal generation unit generating a PWM-signal for on/off-controlling the switching unit, based on the power-source current, the bus-line voltage and a bus-line-voltage command value as a target voltage of the bus-line voltage; a power-source voltage-state detection unit detecting a signal state of the alternate-current voltage based on the voltage zero-cross signal; and a fundamental-switching-frequency selection unit selecting a fundamental switching frequency of the PWM-signal based on the signal state of the alternate-current voltage. The PWM-signal generation unit generates the PWM-signal based on a fundamental switching signal having a fundamental switching frequency selected by the fundamental-switching-frequency selection unit.

6 Claims, 7 Drawing Sheets

(56) References Cited

U.S. PATENT DOCUMENTS

| | | | |
|---|---|---|---|
| 6,567,283 B2* | 5/2003 | Welches | 363/89 |
| 7,184,282 B2* | 2/2007 | Ohshima et al. | 363/40 |
| 7,359,224 B2 | 4/2008 | Li | |
| 7,898,229 B2* | 3/2011 | Babcock et al. | 323/225 |
| 7,898,829 B2* | 3/2011 | Oguchi et al. | 363/44 |
| 8,138,737 B2* | 3/2012 | Osaka | 323/285 |
| 8,212,507 B2* | 7/2012 | Wystup et al. | 318/400.3 |
| 2002/0181258 A1* | 12/2002 | Welches | 363/89 |
| 2006/0256586 A1* | 11/2006 | Ohshima et al. | 363/16 |
| 2009/0067206 A1* | 3/2009 | Oguchi et al. | 363/124 |
| 2009/0290395 A1* | 11/2009 | Osaka | 363/126 |
| 2010/0315027 A1* | 12/2010 | Wystup et al. | 318/400.3 |
| 2011/0019452 A1 | 1/2011 | Shinomoto et al. | |
| 2011/0132899 A1 | 6/2011 | Shimomugi et al. | |
| 2012/0056604 A1* | 3/2012 | Song et al. | 323/207 |
| 2013/0088177 A1* | 4/2013 | Niizuma | 318/139 |

FOREIGN PATENT DOCUMENTS

| | | |
|---|---|---|
| JP | 2006-067638 A | 3/2006 |
| JP | 2007-143383 A | 6/2007 |
| JP | 2008-086053 A | 4/2008 |
| JP | 2010-068552 A | 3/2010 |
| WO | 2009/009197 A2 | 1/2009 |
| WO | 2009/028053 A1 | 3/2009 |

* cited by examiner

| POWER-SOURCE VOLTAGE PHASE | FREQUENCY OF FUNDAMENTAL SWITCHING SIGNAL Sc |
|---|---|
| 0° – 30°, 150° – 180° | fc+α |
| 30° – 60°, 120° – 150° | fc |
| 60° – 120° | fc–α |

* WHERE α > 0

| POWER-SOURCE-VOLTAGE CYCLE NUMBER | FREQUENCY OF FUNDAMENTAL SWITCHING SIGNAL Sc |
|---|---|
| 1-20 CYCLES | fc+β |
| 21-40 CYCLES | fc |
| 41-60 CYCLES | fc-β |

FIG.7

CONVERTER CONTROL DEVICE AND AIR CONDITIONER INCLUDING CONVERTER CONTROL DEVICE

BACKGROUND OF THE INVENTION

1. Field of the Invention

The present invention relates to a converter control device that controls a highly-efficient converter installed in an air conditioner and an air conditioner including the converter control device.

2. Description of the Related Art

There is known a conventional converter control device that obtains a rectified voltage by rectifying an alternate-current power source voltage with a rectifying circuit such as a diode bridge, and improves the power factor using a voltage-boosting reactor and a semiconductor switching element such as a metal-oxide semiconductor field-effect transistor (MOSFET) that is on/off controlled by pulse width modulation (PWM) control. The PWM control of the semiconductor switching element is executed using a triangular wave signal having a constant fundamental switching frequency, and therefore a frequency component of conduction noise caused with the on/off operation of the semiconductor switching element has large peak values at frequencies of integer multiples of the fundamental switching frequency. In addition, because a conducting path of the conduction noise is complicated, an anti-noise measure to prevent noise propagation and leakage to other parts is also complicated. Therefore, in order to achieve design considering a measure to strain the amount of caused noise, the designing needs to be performed with setting a design reference level with a sufficient margin with respect to domestic and international standards related to radiated noise. This design style causes increase of a manufacturing cost, such as increase in size of an anti-noise measure part and increase of the number of parts.

In connection thereto, there has been a converter control device that reduces a peak value of noise by distributing a frequency component of caused noise in such a way that a fundamental switching frequency of a driving signal for on/off controlling a semiconductor switching element is variably controlled based on an absolute value of an alternate-current power source voltage (see, for example, Japanese Patent Application Laid-open No. 2004-282958 [Patent Literature 1]).

In the conventional converter control device, because the on/off control of the semiconductor switching element is executed with a switching operation using a fixed frequency (fundamental switching frequency), the electromagnetic conduction noise caused due to the switching operation has large peaks in frequency components at the integer multiples of the fundamental switching frequency. On the other hand, an electric appliance such as an air conditioner needs to meet the Noise Terminal Voltage Standards (Electrical Appliance and Material Safety Law, the Standard in Article 2 or the like of the Ministerial Ordinance) in order to restrain noise leaked from the appliance. Therefore, when designing electric appliances, noise filters for limiting conduction noise need to be connected in a multi-stage configuration using a large number of noise filter parts, and this causes a problem of increasing a those parts' occupying area in a board and also increasing the manufacturing cost.

The converter control device described in Patent Literature 1 executes control of "setting a switching frequency f of a main switch Q1 to a lower-limit frequency f12 (for example, 20 kHz) when an alternate-current power source voltage Vi is equal to or smaller than a lower-limit setting voltage EB", "setting the switching frequency f of the main switch Q1 to an upper-limit frequency f11 (for example, 100 kHz) when the alternate-current power source voltage Vi is equal to or larger than an upper-limit setting voltage (VZ+EB)", and "gradually changing the switching frequency f from the lower-limit frequency f12 to the upper-limit frequency f11 when the alternate-current power source voltage Vi is in a range between the lower-limit setting voltage EB and the upper-limit setting voltage (VZ+EB)", and therefore the switching frequency is increased in proportion to the value of the alternate-current power source voltage.

Generally, switching noise of a semiconductor element tends to increase as an alternate-current power source voltage becomes higher. On the other hand, the power factor tends to be improved so that the power conversion efficiency is enhanced as the switching frequency is higher, because the current waveform can be close to the alternate-current voltage waveform as the switching frequency is higher. Therefore, in the control described in Patent Literature 1, the caused noise is increased although the power conversion efficiency is enhanced, and there has been a problem in that it is not possible to execute the control while considering both of the amount of caused noise and loss generation that are in a tradeoff relationship with each other.

The present invention has been achieved to solve the above problems, and a first object of the present invention is to provide a converter control device that can achieve control while considering both the amount of caused noise and loss generation in a converter. A second object of the present invention is to provide an air conditioner that includes a convertor control device that executes control while considering both the amount of caused noise and loss generation and can perform operation control considering both the noise generation and loss generation.

SUMMARY OF THE INVENTION

It is an object of the present invention to at least partially solve the problems in the conventional technology.

One aspect of the present invention provides a converter control device controlling a converter main circuit that includes: a rectifying circuit that rectifies an alternate-current voltage from an alternate-current power source and outputs a direct-current voltage between direct-current bus lines; a smoothing capacitor that smoothes the direct-current voltage; a switching unit that is made from a semiconductor element and provided between the direct-current bus lines on a side closer to the power source than the smoothing capacitor; a reactor that is provided in the direct-current bus line on a side closer to the power source than the switching unit; and a back-flow preventing diode that is provided in the direct-current bus line between the smoothing capacitor and the switching unit, and prevents a back flow from the smoothing capacitor to a side of the power source, the converter control device comprising: a voltage-zero-cross detection unit that detects a zero cross of the alternate-current voltage and outputs a voltage zero-cross signal; a power-source-current detection unit that detects a power source current of the alternate-current power source; a bus-line-voltage detection unit that detects a bus line voltage that is a voltage between terminals of the smoothing capacitor; a pulse width modulation (PWM) signal generation unit that generates a PWM signal for on/off controlling the switching unit, based on the power source current, the bus line voltage and a bus-line-voltage command value that is a target voltage of the bus line voltage; a power-source voltage-state detection unit that detects a signal state of the alternate-current voltage based on the voltage zero-cross signal; and a fundamental-switching-frequency selection unit that selects a fundamental switching frequency of the PWM signal based on the signal state of the alternate-current voltage, wherein the PWM signal generation unit generates the PWM signal based on a fundamental switching signal having a fundamental switching frequency selected by the fundamental-switching-frequency selection unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

First Embodiment

Figure 1:
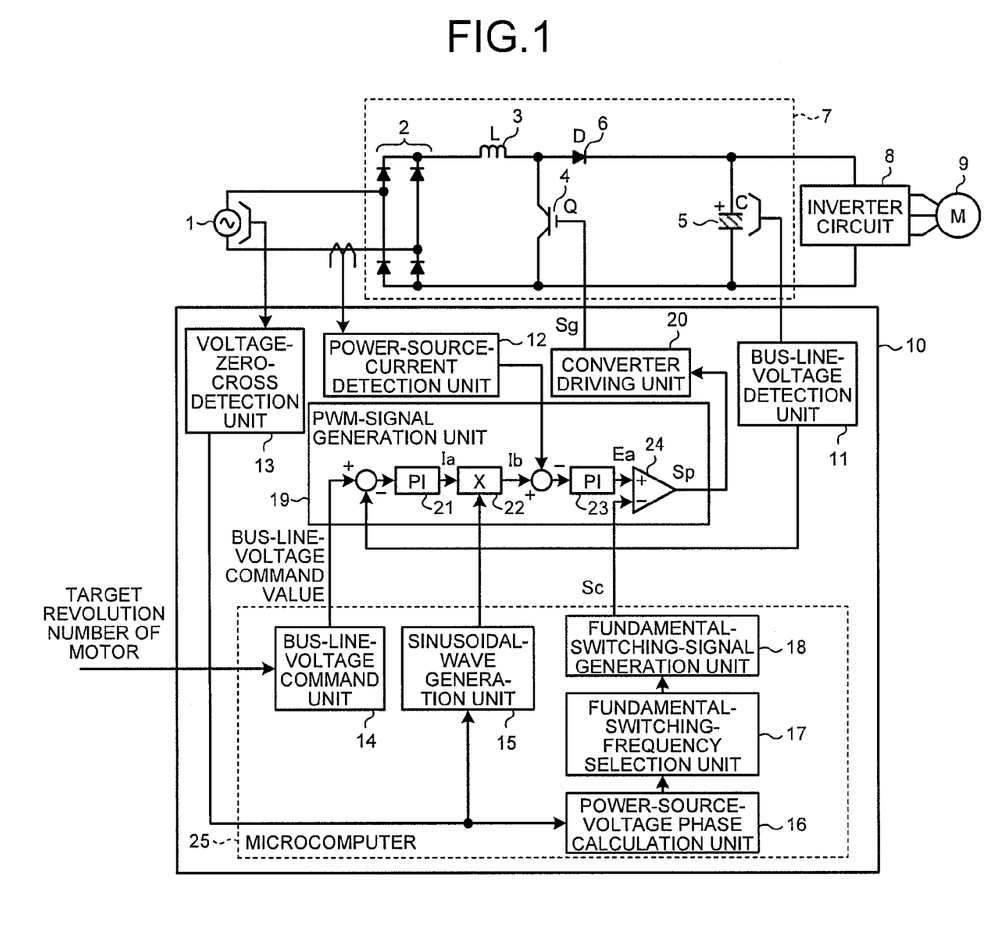
FIG. 1 is a diagram showing a configuration of a converter control device according to a first embodiment of the present invention.

FIG. 1 is a diagram showing a system configuration of an air conditioner including a converter control device 10 according to a first embodiment of the present invention. As shown in FIG. 1, a converter main circuit 7 is constructed of a rectifying circuit 2, a reactor 3, a switching unit 4, a smoothing capacitor 5, and a back-flow preventing diode 6. The rectifying circuit 2 has four diodes connected in a bridge configuration for full-wave-rectifying an alternate-current voltage supplied from an alternate-current power source 1. The reactor 3 has a first end and a second end, of which the first end is connected to a positive output side of the rectifying circuit 2, and smoothes a current. The switching unit 4 is connected between the second end of the reactor 3 and a negative output side of the rectifying circuit 2, and performs switching between direct-current bus lines. The smoothing capacitor 5 is connected between the second end of the reactor 3 and the negative output side of the rectifying circuit 2, and smoothes a direct-current bus-line voltage. The back-flow preventing diode 6 is connected between the second end of the reactor 3 and a positive electrode side of the smoothing capacitor 5, and prevents a back flow of the current from the smoothing capacitor 5 to the rectifying circuit 2. A semiconductor switch such as an insulated gate bipolar transistor (IGBT) or a MOSFET is used as the switching unit 4. An output voltage of the alternate-current power source 1 is a sinusoidal-wave signal having a constant frequency.

An inverter circuit 8 is connected to the smoothing capacitor 5 in parallel and makes rotary drive of the motor 9. Although a compressor driving motor installed in the air conditioner, a fan driving motor installed in an outdoor unit or the like may be used as the motor 9, a compressor driving motor is explained here as the motor 9.

A configuration of the converter control device 10 that controls the converter main circuit 7 is explained next. A bus-line-voltage detection unit 11 measures a bus line voltage that is a voltage between the terminals of the smoothing capacitor 5, and outputs a bus-line voltage value. A power-source-current detection unit 12 measures a bus line current, and outputs a power-current current amplitude value. The current detection is performed using a shunt resistor, a current transformer, or the like. A voltage-zero-cross detection unit 13 detects a timing at which a phase of a voltage signal of the alternate-current power source 1 is 0 degree, as a voltage zero-cross.

A bus-line-voltage command unit 14 determines a bus-line-voltage command value based on a target revolution number of the motor 9, that is a target revolution number of the compressor instructed by a microcomputer (not shown) based on a running operation (such as switching of heating/cooling and temperature setting) of the air conditioner by a user. A sinusoidal-wave generation unit 15 generates a sinusoidal-wave signal that is synchronized with a voltage phase of the alternate-current power source 1, based on the voltage zero-cross signal outputted by the voltage-zero-cross detection unit 13.

A power-source-voltage phase calculation unit 16, a fundamental-switching-frequency selection unit 17, and a fundamental-switching-signal generation unit 18 are coordinated and operated with each other, and generate a fundamental switching signal that is a triangular-wave carrier having a frequency selected based on the voltage phase of the alternate-current power source 1. Details of the operation are described later.

The processes of the bus-line-voltage command unit 14, the sinusoidal-wave generation unit 15, the power-source-voltage phase calculation unit 16, the fundamental-switching-frequency selection unit 17, and the fundamental-switching-signal generation unit 18 may be performed by a microcomputer 25. By collectively performing these processes in the microprocessor, it is possible to easily achieve reduction of the number of parts and customization of process contents based on modification of a processing program.

A PWM-signal generation unit 19 generates a PWM signal Sp for driving the converter main circuit 7, based on a bus-line-voltage command value outputted by the bus-line-voltage command unit 14, a sinusoidal-wave signal outputted by the sinusoidal-wave generation unit 15, a fundamental switching signal Sc outputted by the fundamental-switching-signal generation unit 18, and a bus-line voltage value and a power-source current amplitude value detected by the bus-line-voltage detection unit 11 and the power-source-current detection unit 12, respectively. A configuration of a control block inside the PWM-signal generation unit 19 is described later. A converter driving unit 20 performs the PWM control of the converter main circuit 7 by on/off controlling the switching unit 4 based on the PWM signal generated by the PWM-signal generation unit 19. The PWM-signal generation unit 19 may be implemented by a dedicated control integrated circuit (IC).

An operation of the converter control device 10 is explained next. The converter control device 10 calculates an amplitude target value Ia of a power source current by performing PI control 21, which is a type of feedback control, with respect to a difference between a bus-line-voltage command value outputted by the bus-line-voltage command unit 14 and the bus line voltage outputted by the bus-line-voltage detection unit 11. The converter control device 10 then performs multiplication computation 22 of multiplying the amplitude target value Ia by the sinusoidal-wave signal outputted by the sinusoidal-wave generation unit 15, which is synchronized with the voltage phase of the alternate-current power source 1, to obtain a power-source current command value Ib having a sinusoidal waveform synchronized with the voltage phase of the alternate-current power source 1.

Subsequently, the converter control device 10 calculates a reference voltage Ea by executing PI control 23 with respect to a difference between the power-source current command value Ib and the power-source current amplitude value outputted by the power-source-current detection unit 12. The converter control device 10 then performs comparison computation 24 of comparing the reference voltage Ea with the fundamental switching signal Sc that is a triangular-wave carrier outputted from the fundamental-switching-signal generation unit 18, and outputs a PWM signal Sp that has an ON value when a value of the reference voltage Ea is equal to or larger than a value of the fundamental switching signal Sc and an OFF value when the value of the reference voltage Ea is smaller than the value of the fundamental switching signal Sc.

The converter driving unit 20 outputs a converter driving signal Sg for driving the switching unit 4 to an ON state when the PWM signal Sp has the ON value and driving the switching unit 4 to an OFF state when the PWM signal Sp has the OFF value. In this manner, the converter control device 10 can control the converter main circuit 7 so that the bus line voltage outputted from the converter main circuit 7 matches the bus-line-voltage command value and the power factor becomes substantially equal to 1.

A unit that generates the fundamental switching signal Sc is explained next. The power-source-voltage phase calculation unit 16 counts an elapsed time from the voltage zero-cross signal outputted from the voltage-zero-cross detection unit 13, and calculates a power-source voltage phase from the elapsed time and a signal cycle of the alternate-current power source 1. The power-source voltage phase is represented as 0 degree at the time when the voltage zero-cross signal is generated, and one cycle thereof is represented as 360 degrees.

The power-source-voltage phase calculation unit 16 functions as a power-source voltage-state detection unit that calculates a voltage phase based on the voltage zero-cross signal, as a signal state of the alternate-current voltage of the alternate-current power source 1.

Figure 2:
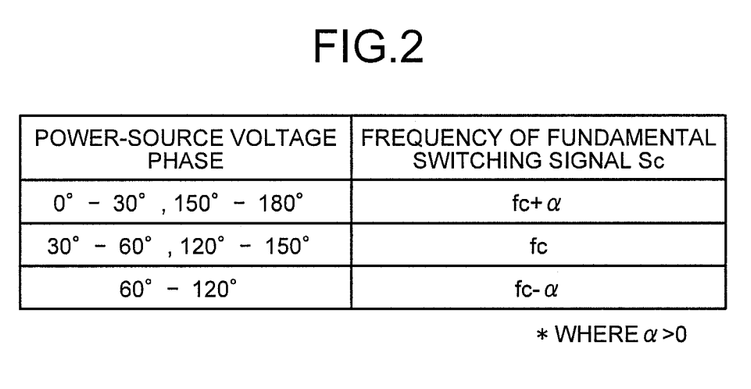
FIG. 2 is a chart showing a correspondence relationship between a power-source voltage phase and a frequency of a fundamental switching signal in the first embodiment.

The fundamental-switching-frequency selection unit 17 selects a frequency of the fundamental switching signal Sc based on the power-source voltage phase calculated by the power-source-voltage phase calculation unit 16. FIG. 2 depicts a correspondence relationship between the power-source voltage phase and the frequency of the fundamental switching signal Sc. The fundamental-switching-frequency selection unit 17 selects fc+α as the frequency of the fundamental switching signal Sc when the power-source voltage phase is equal to or larger than 0 degree and smaller than 30 degrees or equal to or larger than 150 degrees and smaller than 180 degrees, where fc is a center frequency [Hz] and α is a correction amount [Hz], selects fc as the frequency of the fundamental switching signal Sc when the power-source voltage phase is equal to or larger than 30 degrees and smaller than 60 degrees or equal to or larger than 120 degrees and smaller than 150 degrees, and selects fc−α as the frequency of the fundamental switching signal Sc when the power-source voltage phase is equal to or larger than 60 degrees and smaller than 120 degrees. Here, α is larger than 0, that is, α is a positive value. The center frequency fc means a frequency of the fundamental switching signal Sc when a correction of the frequency is not performed.

Figure 3:
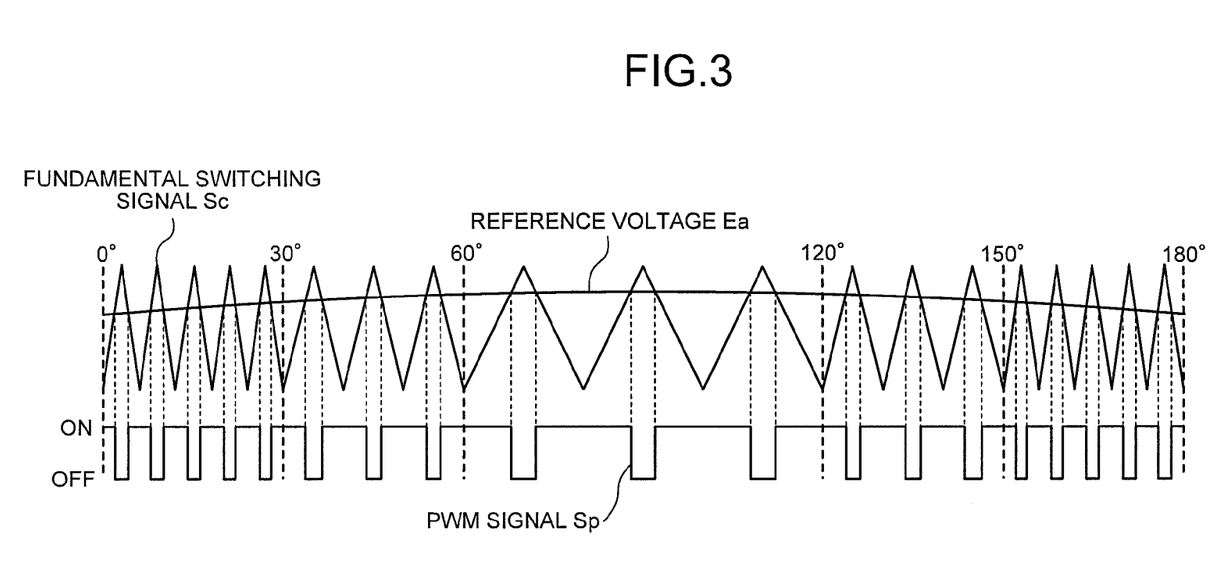
FIG. 3 is an illustration showing a waveform example of a reference voltage Ea, a fundamental switching signal Sc and a PWM signal Sp in the first embodiment.

The fundamental-switching-signal generation unit 18 generates the fundamental switching signal Sc that is a triangular-wave carrier having the frequency selected by the fundamental-switching-frequency selection unit 17. The fundamental switching signal Sc is then subjected to the comparison computation 24 with the reference voltage Ea as described above, in which the PWM signal Sp is outputted based on a magnitude relationship between the fundamental switching signal Sc and the reference voltage Ea. FIG. 3 is a waveform example showing the PWM signal Sp generated in this manner together with the fundamental switching signal Sc and the reference voltage Ea. The frequency of the fundamental switching signal Sc can be changed at three steps based on the power-source voltage phase, and according to this change, the cycle of the PWM signal Sp is changed. The converter driving unit 20 outputs the converter driving signal Sg for on/off driving a gate terminal of the switching unit 4 at an on/off timing of the PWM signal Sp. With this configuration, it is possible to drive the switching unit 4 with a driving signal having a frequency (cycle) that is changed according to the power-source voltage phase.

It is recognized that the frequency of the fundamental switching signal Sc is increased when the power-source voltage phase of the alternate-current power source 1 is equal to or larger than 0 degree and smaller than 30 degrees or equal to or larger than 150 degrees and smaller than 180 degrees, and decreased when the power-source voltage phase is equal to or larger than 60 degrees and smaller than 120 degrees, with reference to a case where the power-source voltage phase is equal to or larger than 30 degrees and smaller than 60 degrees or equal to or larger than 120 degrees and smaller than 150 degrees. In response to this, the frequency of the PWM signal Sp is changed in the same manner.

Effects in the converter control exerted by the converter control device 10 are explained next.

The efficiency of the converter main circuit 7 is described first. When the power-source voltage phase of the alternate-current power source 1 is equal to or larger than 30 degrees and smaller than 60 degrees or equal to or larger than 120 degrees and smaller than 150 degrees, the frequency of the converter driving signal Sg is the same as the center frequency fc, and therefore the efficiency of the converter at this time is set to a reference. When the power-source voltage phase is equal to or larger than 0 degree and smaller than 30 degrees or equal to or larger than 150 degrees and smaller than 180 degrees, control is made such that the frequency of the converter driving signal Sg becomes larger than the center frequency fc. This increases the switching frequency of the switching unit 4, and therefore the power factor of the converter is improved, and the efficiency of the converter is enhanced as compared to the case where the frequency of the converter driving signal Sg is set the same as the center frequency fc. On the other hand, when the power-source voltage phase is equal to or larger than 60 degrees and smaller than 120 degrees, control is made such that the frequency of the converter driving signal Sg becomes smaller than the center frequency fc, and therefore the efficiency of the converter is decreased as compared to the case where the frequency of the converter driving signal Sg is set the same as the center frequency fc. In this manner, the efficiency of the converter main circuit 7 is changed at three steps according to the change of the frequency of the converter driving signal Sg. However, because a width of the increase and decrease of the frequency is ±α and a width of the power-source voltage phase at each step is the same (a width of 60 degrees), the efficiency in all the cycles of the converter main circuit 7 can be substantially the same as the efficiency in a case where the frequency of the converter driving signal Sg is fixed to the center frequency fc.

The loss of the converter main circuit 7 is described next. When the power-source voltage phase is equal to or larger than 0 degree and smaller than 30 degrees or equal to or larger than 150 degrees and smaller than 180 degrees, control is made such that the frequency of the converter driving signal Sg becomes larger than the center frequency fc, and therefore the switching loss of the switching unit 4 is increased as compared to the case where the frequency of the converter driving signal Sg is set the same as the center frequency fc. However, in this range of the power-source voltage phase, a voltage amplitude value of the alternate-current power source 1 is small as compared to the maximum amplitude value, and accordingly the power source current is also small. Therefore, it is possible to restrain an increase width of the loss of the converter main circuit 7. On the other hand, when the power-source voltage phase is equal to or larger than 60 degrees and smaller than 120 degrees, control is made such that the frequency of the converter driving signal Sg becomes smaller than the center frequency fc, and therefore the loss of the converter is decreased as compared to the case where the frequency of the converter driving signal Sg is set the same as the center frequency fc. In this manner, the loss of the converter main circuit 7 is changed at three steps according to the change of the frequency of the converter driving signal Sg. However, in the same manner as the efficiency of the converter main circuit 7, it is possible to achieve the loss in the whole power-source voltage phase of the converter main circuit 7 substantially the same as the loss in the case where the frequency of the converter driving signal Sg is fixed to the center frequency fc.

Figure 4:
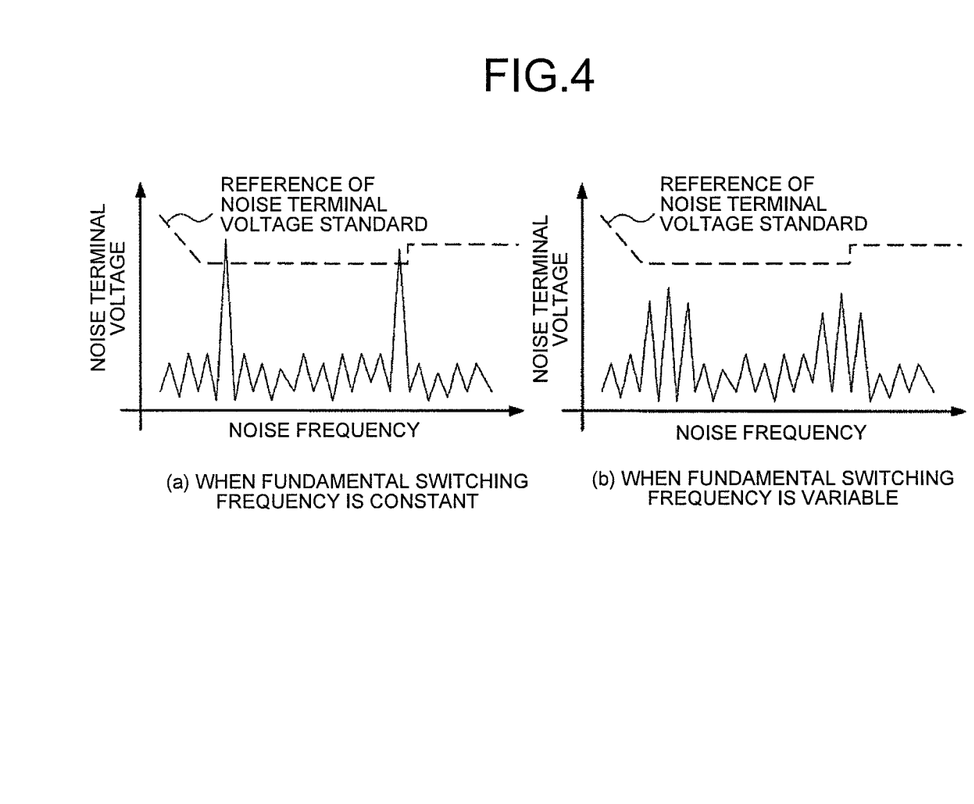
FIG. 4 is graphs showing frequency distributions of generated noise in the first embodiment.

The noise generated by the converter main circuit 7 is described next. The noise is generated due to the switching operation of the switching unit 4. FIG. 4 depicts noise generated by the converter main circuit 7 as a noise terminal voltage with respect to a noise frequency. FIG. 4(a) depicts noise generated when the frequency of the fundamental switching signal Sc is fixed to a constant value as in a conventional converter control device for comparison, and FIG. 4(b) depicts noise generated in the converter control device 10 according to the first embodiment.

As shown in FIG. 4(a), in a conventional converter control device, because the frequency of the fundamental switching signal Sc is fixed, the noise peak exists at a specific frequency, and for this peak value a reference of the Noise Terminal Voltage Standards that is a noise restriction value may not be satisfied. On the other hand, as shown in FIG. 4(b), in the converter control device 10 according to the first embodiment, because the frequency of the converter driving signal Sg is changed according to the power-source voltage phase of the alternate-current power source 1, it is possible to distribute frequencies of the generated noise components to a broad frequency range, so that the peak value of the noise is decreased. Therefore, it is possible to restrain a specific noise frequency component to satisfy a reference of the Noise Terminal Voltage Standards.

As described above, in the converter control device according to the first embodiment, the frequency of the converter driving signal Sg for on/off switching the switching unit of the converter main circuit is changed based on the power-source voltage phase of the alternate-current power source, and therefore it is possible to achieve distribution of the frequency components of the noise generated from the converter device and reduction of the peak noise while maintaining the efficiency and the loss of the converter to the same levels as the efficiency and the loss of a conventional converter device, with restraining influence on the converter's loss and efficiency.

Although the switching unit 4 is realized by a semiconductor switch such as an IGBT or MOSFET in the above explanations, not only a silicon (Si) semiconductor but a wide bandgap semiconductor may be also used for the semiconductor. The material of the wide bandgap semiconductor includes, for example, silicon carbide (SiC), a gallium nitride (GaN)-based material, diamond.

A switching unit made from the wide bandgap semiconductor has a considerably short switching time as compared to a switching unit made from a Si-based semiconductor (equal to or smaller than about 1/10 of a switching time of the Si-based semiconductor), and therefore it is possible to achieve a small switching loss and performance for a high frequency. In addition, because its on-resistance is small, it is also possible to greatly reduce a steady state loss (to be equal to or smaller than about 1/10 of a steady state loss of the Si-based semiconductor). Therefore, the high efficiency of the switching unit can be realized by means of the wide bandgap semiconductor. In addition, by using the wide bandgap semiconductor, it is possible to realize high-frequency operation of the switch unit 4 and set the change width of the fundamental switching frequency selected by the fundamental-switching-frequency selection unit 17 to a larger value. For example, if the fundamental switching frequency is changed at three or more steps so that the change width of the fundamental switching frequency is increased in the whole phase area of the power source voltage, then the frequencies of the conduction noise components generated from the converter main circuit can be further distributed, thereby making it possible to further reduce the peak noise. This makes it possible to simplify the configuration of the noise filter, reduce the number of parts, reduce the occupied area on the board, and achieve a reduction of the manufacturing cost.

Second Embodiment

The converter control device according to the first embodiment changes the frequency of the converter driving signal Sg based on the phase of the alternate-current power source voltage. Meanwhile, in a second embodiment of the present invention, a converter control device that changes the frequency of the converter driving signal Sg based on the number of cycles of the alternate-current power source voltage. In the following explanations, the number of cycles is a time obtained by counting cycles in units of one cycle of an alternate-current power source voltage.

Figure 5:
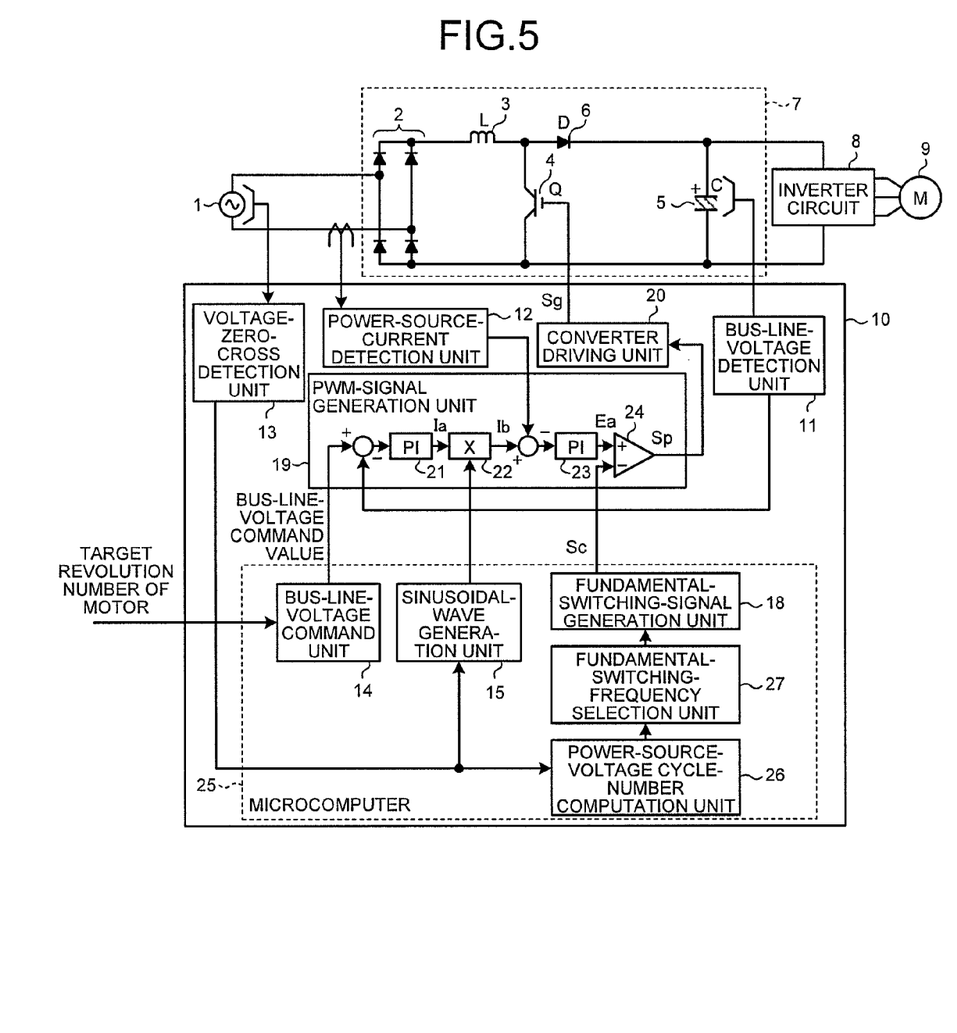
FIG. 5 is a diagram showing a configuration of a converter control device according to a second embodiment of the present invention.

A configuration of the converter control device according to the second embodiment is shown in FIG. 5. A difference from the configuration of the first embodiment (FIG. 1) is that a power-source-voltage cycle-number computation unit 26 and a fundamental-switching-frequency selection unit 27 are provided instead of the power-source-voltage phase calculation unit 16 and the fundamental-switching-frequency selection unit 17. Configurations of the second embodiment other than the difference are identical to those of the first embodiment, and thus constituent elements of the second embodiment identical to those of the first embodiment are denoted by the same reference signs and explanations thereof will be omitted.

The power-source-voltage cycle-number computation unit 26 counts the number of cycles of a voltage signal (also referred to as "voltage cycle number") of the alternate-current power source 1 from a voltage zero-cross signal outputted from the voltage-zero-cross detection unit 13. Specifically, a synchronous counter that can count from 1 to N (N is a predetermined number) is provided, and the voltage zero-cross signal is used as a clock signal of the synchronous counter, whereby the synchronous counter is counted up at a timing when the voltage zero-cross signal is activated. With this configuration, the voltage cycle number of the alternate-current power source 1 can be computed in a range from 1 to N. When the count value of the synchronous counter becomes N, the counter is returned to 1 and continues the counting, by which the voltage cycle number can be computed in a continuous manner. In the following explanations, N is set to 60.

The power-source-voltage cycle-number computation unit 26 functions as a power-source voltage-state detection unit that calculates the voltage cycle number based on the voltage zero-cross signal, as a signal state of the alternate-current voltage of the alternate-current power source 1.

Figure 6:
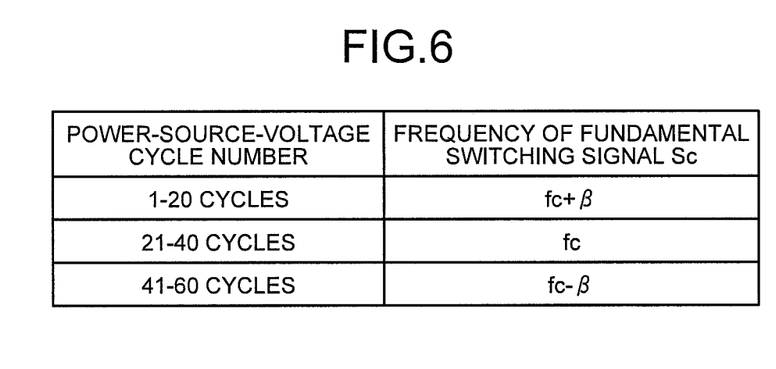
FIG. 6 is a chart showing a correspondence relationship between the number of power-source-voltage cycles and a frequency of a fundamental switching signal in the second embodiment.

The fundamental-switching-frequency selection unit 27 selects the fundamental switching signal Sc based on the voltage cycle number calculated by the power-source-voltage cycle-number computation unit 26. FIG. 6 depicts a correspondence relationship between the number of voltage cycles (voltage cycle number) and the frequency of the fundamental switching signal Sc. The fundamental-switching-frequency selection unit 27 selects fc+β as the frequency of the fundamental switching signal Sc when the voltage cycle number is equal to or larger than 0 and equal to or smaller than 20, where fc is a center frequency [Hz] and β is a correction amount [Hz], selects fc as the frequency of the fundamental switching signal Sc when the voltage cycle number is equal to or larger than 21 and equal to or smaller than 40, and selects fc−β as the frequency of the fundamental switching signal Sc when the voltage cycle number is equal to or larger than 41 and equal to or smaller than 60. The center frequency fc is a frequency of the fundamental switching signal Sc when correction of the frequency is not performed. Although it is only necessary that β is not equal to 0 (β≠0), in the following descriptions, β is larger than 0 (β>0), that is, β is set to a positive value.

Figure 7:
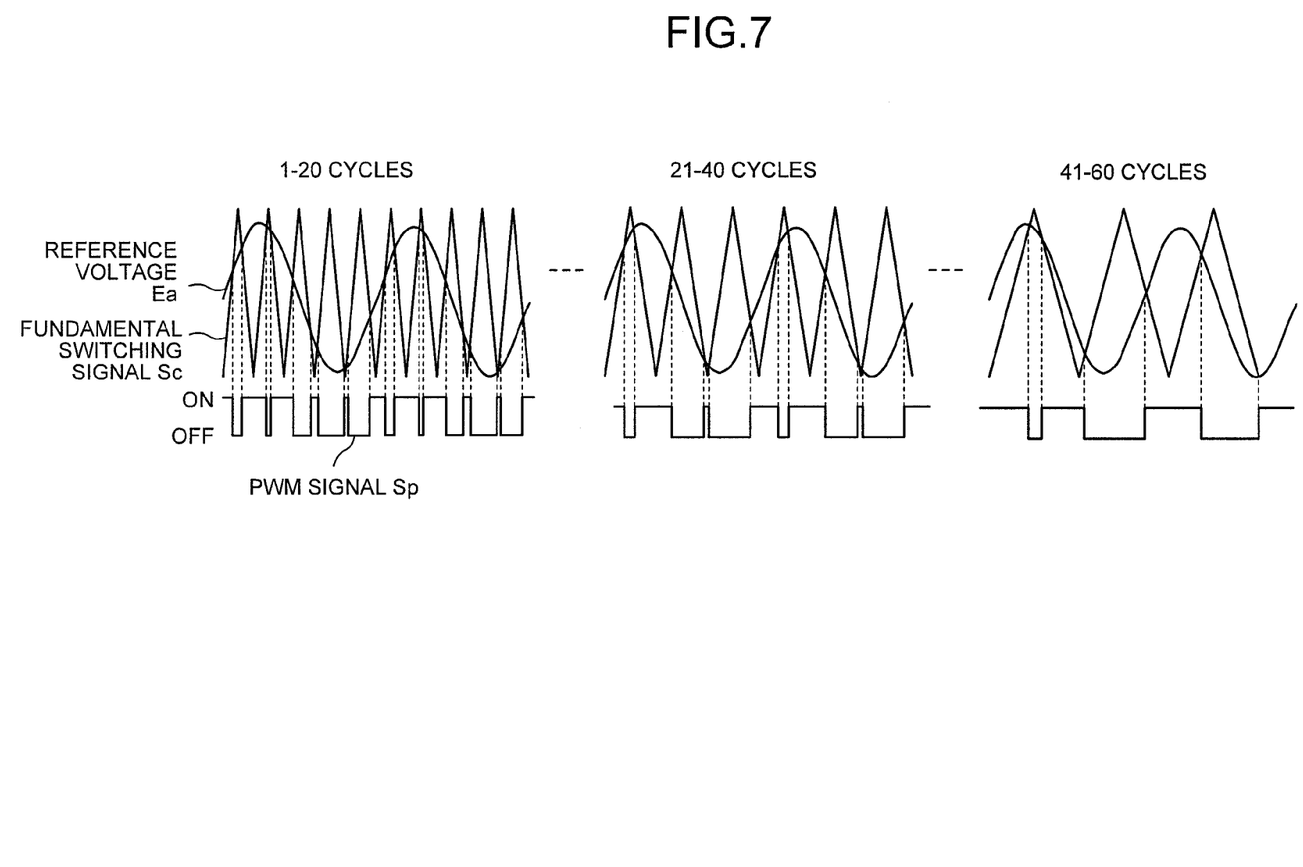
FIG. 7 is illustrations showing waveform examples of the reference voltage Ea, the fundamental switching signal Sc and the PWM signal Sp in the second embodiment.

The fundamental-switching-signal generation unit 18 generates the fundamental switching signal Sc that is a triangular-wave carrier having a frequency selected by the fundamental-switching-frequency selection unit 27. Operations of the PWM-signal generation unit 19 and the subsequent units are the same as those of the first embodiment. FIG. 7 is a timing chart of the PWM signal Sp generated in this manner together with the fundamental switching signal Sc and the reference voltage Ea. The frequency of the fundamental switching signal Sc can be changed at three steps according to the voltage cycle number, and accordingly, the frequency of the PWM signal Sp is also changed at three steps. With this configuration, it is possible to drive the switching unit 4 with the converter driving signal Sg having the frequency that is changed based on the voltage cycle number.

Effects in the converter control exerted by the converter control device 10 configured as described above are explained next. The efficiency of the converter main circuit 7 is described first. The efficiency of the converter main circuit 7 is changed at three steps according to the change of the frequency of the converter driving signal Sg. However, because a width of the increase and decrease of the frequency is ±β and a width of the voltage cycle number of the power-source voltage at each step is the same (a width of 20 cycles), it is possible to achieve the efficiency in all the cycles of the converter main circuit 7 substantially the same as the efficiency in a case where the frequency of the converter driving signal Sg is fixed to the center frequency fc.

Furthermore, the loss of the converter main circuit 7 is also changed at three steps according to the change of the frequency of the converter driving signal Sg. However, in the same manner as the efficiency of the converter main circuit 7, it is possible to achieve the loss in all the voltage cycles of the converter main circuit 7 substantially the same as the loss in the case where the frequency of the converter driving signal Sg is fixed to the center frequency fc.

The noise generated at the converter main circuit 7 is explained next. Because the frequency of the converter driving signal Sg is changed with ±β centering around the center frequency fc, it is possible to distribute frequencies of the generated noise components to a broad frequency range, so that the peak value of the noise is decreased. Therefore, it is possible to restrain a specific noise frequency component to comply with the Noise Terminal Voltage Standards.

The above description is directed to a case where the frequency of the converter driving signal Sg is changed at three steps, but the frequency may be changed at multiple steps (M steps, where M is a positive integer) and M may be set to a large value, whereby it is possible to further reduce the peak value of the noise.

The converter control device according to the present invention can achieve distribution of frequency components of noise generated from a converter main circuit and reduction of peak noise while maintaining the efficiency and generated loss of the converter main circuit in the same levels as the efficiency and generated loss of a conventional converter main circuit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A converter control device controlling a converter main circuit that includes:
   a rectifying circuit that rectifies an alternate-current voltage from an alternate-current power source and outputs a direct-current voltage between direct-current bus lines;
   a smoothing capacitor that smoothes the direct-current voltage;
   a switching unit that is made from a semiconductor element and provided between the direct-current bus lines on a side closer to the power source than the smoothing capacitor;
   a reactor that is provided in the direct-current bus line on a side closer to the power source than the switching unit; and
   a back-flow preventing diode that is provided in the direct-current bus line between the smoothing capacitor and the switching unit, and prevents a back flow from the smoothing capacitor to a side of the power source,
   the converter control device comprising:
   a voltage-zero-cross detection unit that detects a zero cross of the alternate-current voltage and outputs a voltage zero-cross signal;

a power-source-current detection unit that detects a power source current of the alternate-current power source;

a bus-line-voltage detection unit that detects a bus line voltage that is a voltage between terminals of the smoothing capacitor;

a pulse width modulation (PWM) signal generation unit that generates a PWM signal for on/off controlling the switching unit, based on the power source current, the bus line voltage and a bus-line-voltage command value that is a target voltage of the bus line voltage;

a power-source voltage-state detection unit that detects a signal state of the alternate-current voltage based on the voltage zero-cross signal; and a fundamental-switching-frequency selection unit that selects a fundamental switching frequency of the PWM signal based on the signal state of the alternate-current voltage, wherein the PWM signal generation unit generates the PWM signal based on a fundamental switching signal having a fundamental switching frequency selected by the fundamental-switching-frequency selection unit.

2. The converter control device according to claim 1, wherein
the power-source voltage-state detection unit calculates a voltage phase of the alternate-current power source based on the voltage zero-cross signal, as the signal state of the alternate-current voltage, and
the fundamental-switching-frequency selection unit selects a fundamental switching frequency of the PWM signal based on the voltage phase.

3. The converter control device according to claim 1, wherein
the power-source voltage-state detection unit calculates a voltage cycle number of the alternate-current power source based on the voltage zero-cross signal, as the signal state of the alternate-current voltage, and
the fundamental-switching-frequency selection unit selects a fundamental switching frequency of the PWM signal based on the voltage cycle number.

4. The converter control device according to claim 1, wherein the switching unit is formed by a wide bandgap semiconductor element.

5. The converter control device according to claim 4, wherein a material of the wide bandgap semiconductor element is silicon carbide (SiC), gallium nitride (GaN)-based material, or diamond.

6. An air conditioner comprising:
the converter control device according to claim 1;
a converter main circuit that is controlled by the converter control device; and
an inverter that converts direct-current power outputted from the converter main circuit into alternate-current power to drive a motor.

* * * * *